(12) United States Patent
Scotchmer

(10) Patent No.: US 10,882,196 B2
(45) Date of Patent: Jan. 5, 2021

(54) CONTROLLED ENVIRONMENT PROCESSING APPARATUS AND METHOD

(71) Applicant: Huys Industries Limited, Weston (CA)

(72) Inventor: Nigel Scotchmer, Willowdale (CA)

(73) Assignee: Huys Industries Limited

( * ) Notice: Subject to any disclaimer, the term of this patent is extended or adjusted under 35 U.S.C. 154(b) by 348 days.

(21) Appl. No.: 15/898,508

(22) Filed: Feb. 17, 2018

(65) Prior Publication Data

US 2018/0236672 A1  Aug. 23, 2018

Related U.S. Application Data

(60) Provisional application No. 62/460,380, filed on Feb. 17, 2017.

(51) Int. Cl.
| | |
|---|---|
| *B25J 21/02* | (2006.01) |
| *B23K 9/32* | (2006.01) |
| *B23K 9/16* | (2006.01) |
| *B23K 37/00* | (2006.01) |
| *G21F 7/02* | (2006.01) |
| *G21F 7/04* | (2006.01) |

(52) U.S. Cl.
CPC ............. *B25J 21/02* (2013.01); *B23K 9/162* (2013.01); *B23K 9/325* (2013.01); *B23K 37/00* (2013.01); *G21F 7/02* (2013.01); *G21F 7/041* (2013.01)

(58) Field of Classification Search
CPC .. B25J 21/02; G21F 7/02; G21F 7/041; G21F 7/053; G21F 7/04; G21F 7/047; G21F 7/045
USPC ......................................................... 219/158
See application file for complete search history.

(56) References Cited

U.S. PATENT DOCUMENTS

| | | | | |
|---|---|---|---|---|
| 5,730,765 | A * | 3/1998 | Henry | B01L 1/02 96/420 |
| 9,387,535 | B2 * | 7/2016 | Darling | B22F 9/04 |
| 2009/0166370 | A1 * | 7/2009 | De Turk | G21F 7/06 221/8 |

* cited by examiner

*Primary Examiner* — Jennifer C Chiang
(74) *Attorney, Agent, or Firm* — Ridout & Maybee LLP

(57) ABSTRACT

A glove box has an enclosure having a glass window top and gloves mounted to the front wall. The enclosure can be tilted to so that one or other, or both, of the work piece and the window can be placed at an angle such as may facilitate processing. The glove box has an environmental control system to both to permit flushing with inert or other desired gases, and to permit heating or cooling. The workstand may have cooling passages as well. Controls are mounted inside the enclosure chamber to permit the operator to change working parameters without removing his or her hands from the gloves. A parameter status display may be located outside the enclosure. The window may be provided with a movable smoked glass filter for use during welding. The workstand may be independently adjustable for angle within the enclosure. The glove box has electrical and cooling service penetrations to permit use of a welding electrode.

20 Claims, 16 Drawing Sheets

US 10,882,196 B2

CONTROLLED ENVIRONMENT PROCESSING APPARATUS AND METHOD

CROSS-REFERENCE TO RELATED APPLICATIONS

This application claims priority to and the benefit of U.S. Provisional Patent Application Ser. No. 62/460,380, filed Feb. 17, 2017, the disclosures of which are incorporated herein in their entirety by reference.

FIELD OF THE INVENTION

This Application relates to an apparatus in which to establish controlled environmental conditions, and a method of operation and use thereof.

BACKGROUND OF THE INVENTION

On occasion it may be desirable to be able undertake manufacturing processes in a controlled environment. Sometimes such processes are undertaken in a chamber that may be referred to as a "glove box", namely a chamber having a controlled internal environment but also having gloves that allow a person positioned outside the chamber to work upon an object located inside the chamber. One such activity may involve the deposition of a coating material upon a substrate, as by a welding or welding-like process.

SUMMARY OF THE INVENTION

In an aspect of the invention there is a glove box. It has an enclosure having a working chamber defined therewithin. The enclosure has a viewing portion. The enclosure has at least one gauntlet extending into the working chamber. There is piping connected to permit a selected atmosphere to be established within the chamber. The enclosure has an access by which to introduce a work-piece into the chamber. The enclosure has an angular adjustment by which to tilt at least one of the gauntlet and the viewing portion.

In a feature of that aspect of the invention, the access includes an environmental lock antechamber. In an additional feature the environmental lock antechamber has piping to permit the antechamber to be flushed and charged with gases independently of the chamber. In still another feature, the glove box has at least a first parameter read out display, the read-out display being located outside the chamber. In another feature, a seat is mounted within the chamber in which to accommodate the work-piece. In still another feature, the enclosure is angularly adjustable relative to the seat. In yet another feature, there is at least a first sealed utility penetration through a wall of the enclosure. In a further feature, the glove box has a heat exchanger mounted there within by which to adjust temperature within the chamber. In another feature, the glove box has a tool interface there within, and the tool interface includes a coolant line connection.

In another feature of the invention, the apparatus has an independently flushable access antechamber mounted to the enclosure. There is a seat in which to mount a work-piece, and a welding electrode holder in which to mount a consumable electrode. A welding electrode power connection passes through a sealed penetration of the enclosure, in use the welding electrode holder being mounted thereto. There is a second gauntlet in addition to the first gauntlet. A heat exchanger is mounted within the enclosure, and is operable to extract heat therefrom. There are controls, for at least one of (a) power to the welding electrode holder; and (b) cooling of the heat exchanger located within the enclosure.

In another aspect of the invention there is a glove box. It has an enclosure having a working chamber defined therewithin. The enclosure has a viewing portion and at least one gauntlet extending into the working chamber. There is an access by which to introduce a work-piece into the chamber, and piping by which to introduce gases into the chamber. There is an environmental control system operable to govern temperature within the chamber.

In still another aspect of the invention, there is a glove box. It has an enclosure having a working chamber defined there within, the enclosure having a viewing portion and at least a first gauntlet extending into the working chamber. There is an access by which to introduce a work-piece into the chamber, and a tool for use by an operator to engage the work piece. There is a controller of the tool mounted within the chamber, the controller being adjustable by an operator wearing the first gauntlet.

In another aspect of the invention there is any combination of any of the features of any one of embodiments shown or described herein, in combination with the features of any other embodiment, except to the extent those features are mutually exclusive. In another aspect of the invention, there is any apparatus substantially as shown or described herein, in whole or in part.

BRIEF DESCRIPTION OF THE DRAWINGS

These aspects and other features of the invention can be understood with the aid of the following illustrations of a number of exemplary, and non-limiting, embodiments of the principles of the invention in which:

FIG. 2 is a top view of the glove box of FIG. 1a;

FIG. 3 is a front view of the glove box of FIG. 1a;

FIG. 4 is a left hand side view of the glove box of FIG. 1a;

FIG. 5 is a right hand side view of the glove box of FIG. 1a;

FIG. 7 is a cross-sectional conceptual view of an alternate embodiment of glove box to that of FIG. 1a;

FIG. 8a is a cross-sectional view of the glove box of FIG. 1a;

FIG. 8b is an enlarged detail of the glove box of FIG. 8a;

FIG. 10 shows a welding electrode holder tool such as might be used in the glove box of FIG. 1a.

DETAILED DESCRIPTION

Figure 1A:
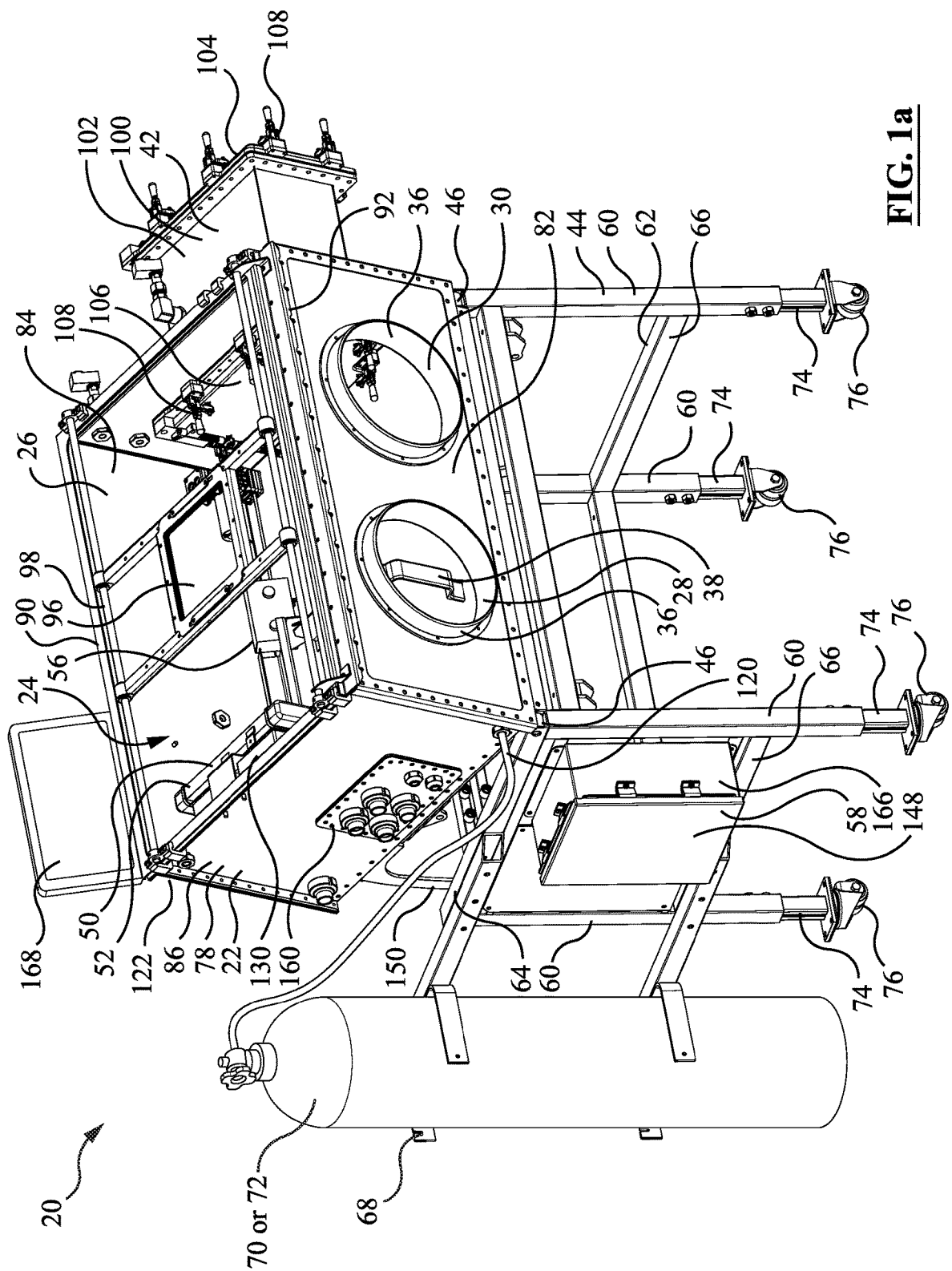
FIG. 1a shows a perspective view from the front right corner of a controlled atmosphere chamber, or glove box.
Figure 1B:
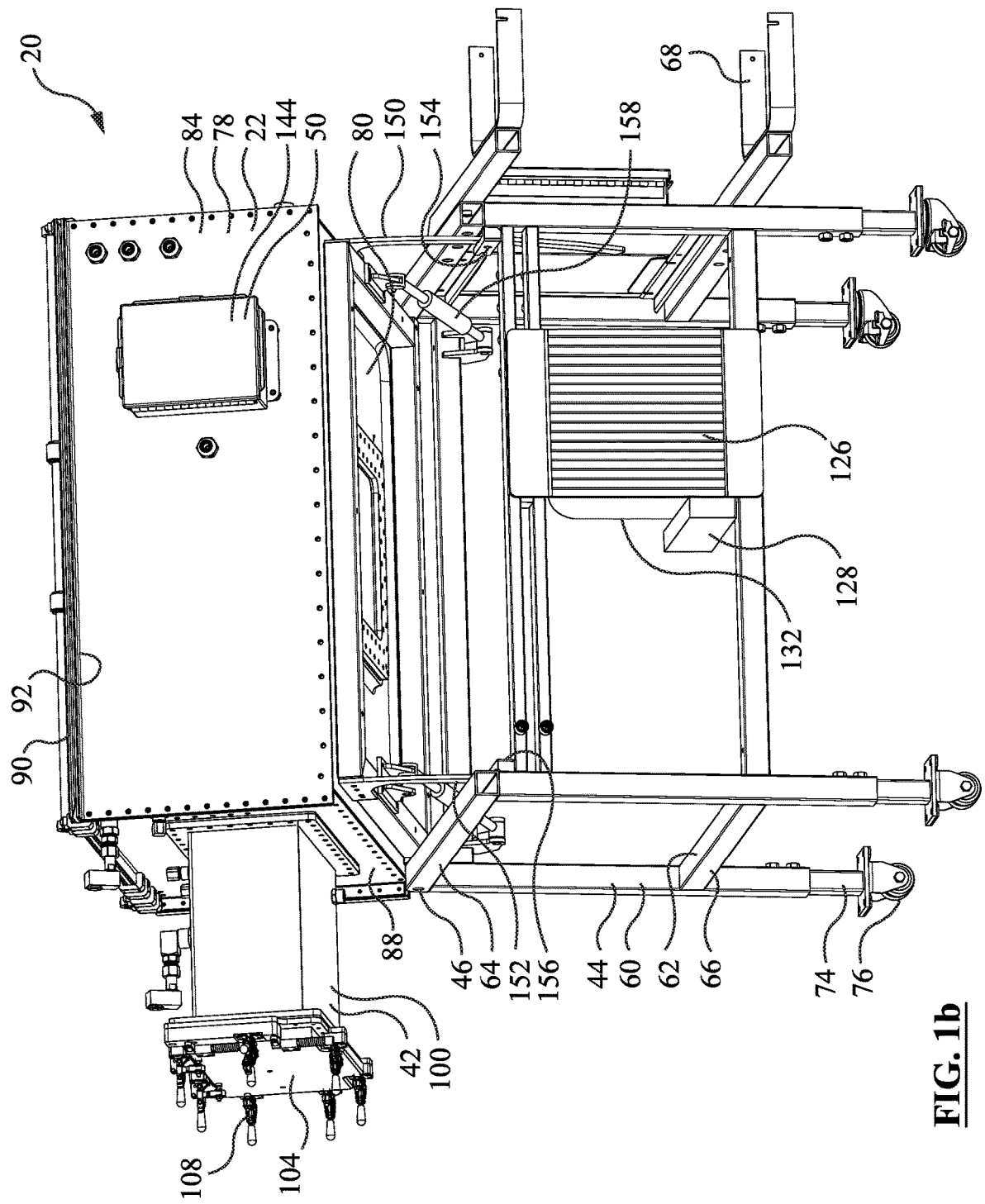
FIG. 1b shows a perspective view of the glove box of FIG. 1a from behind and to the left.
Figure 1C:
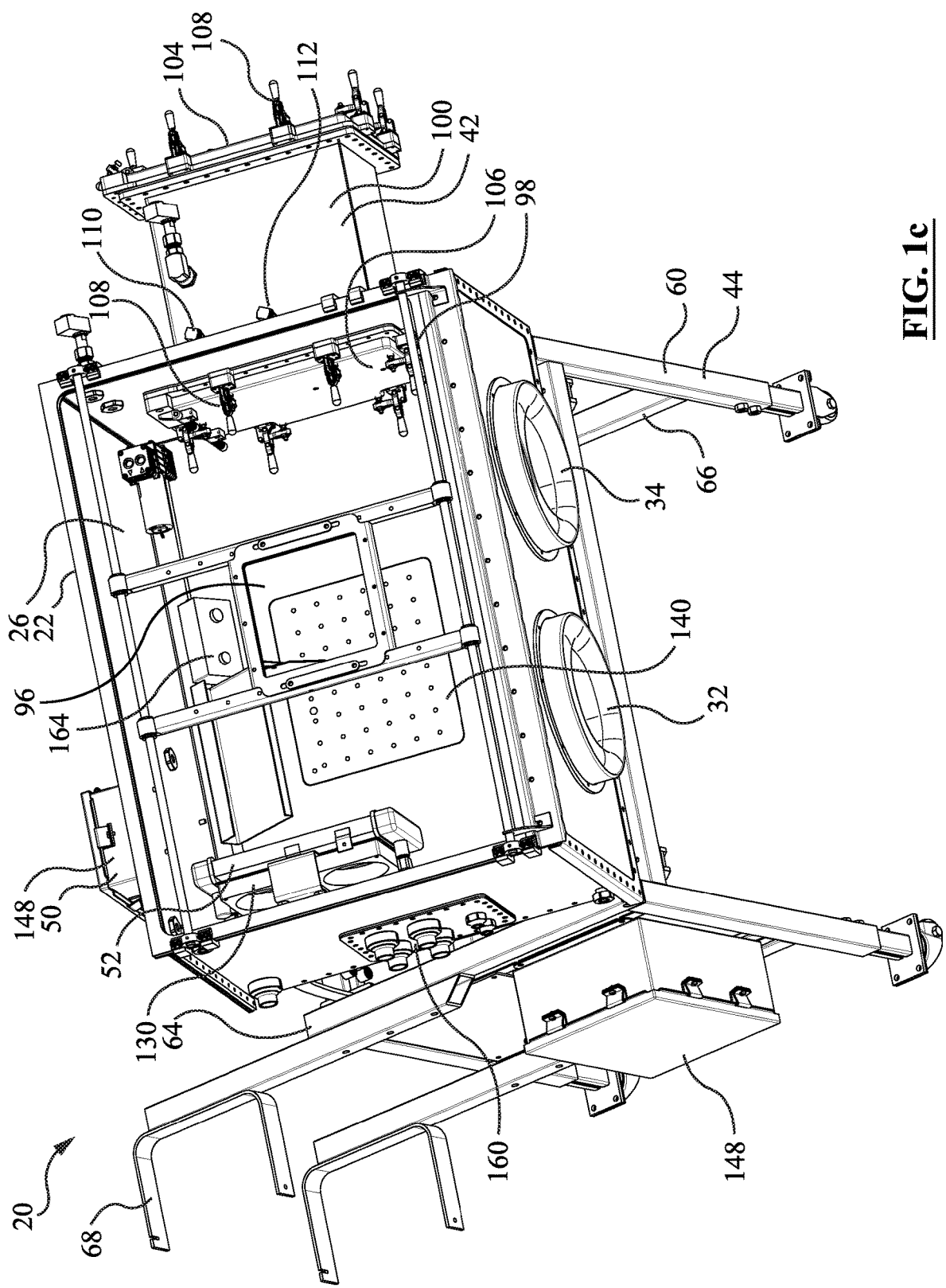
FIG. 1c shows a perspective view of the glove box of FIG. 1a from in front and above.
Figure 1D:
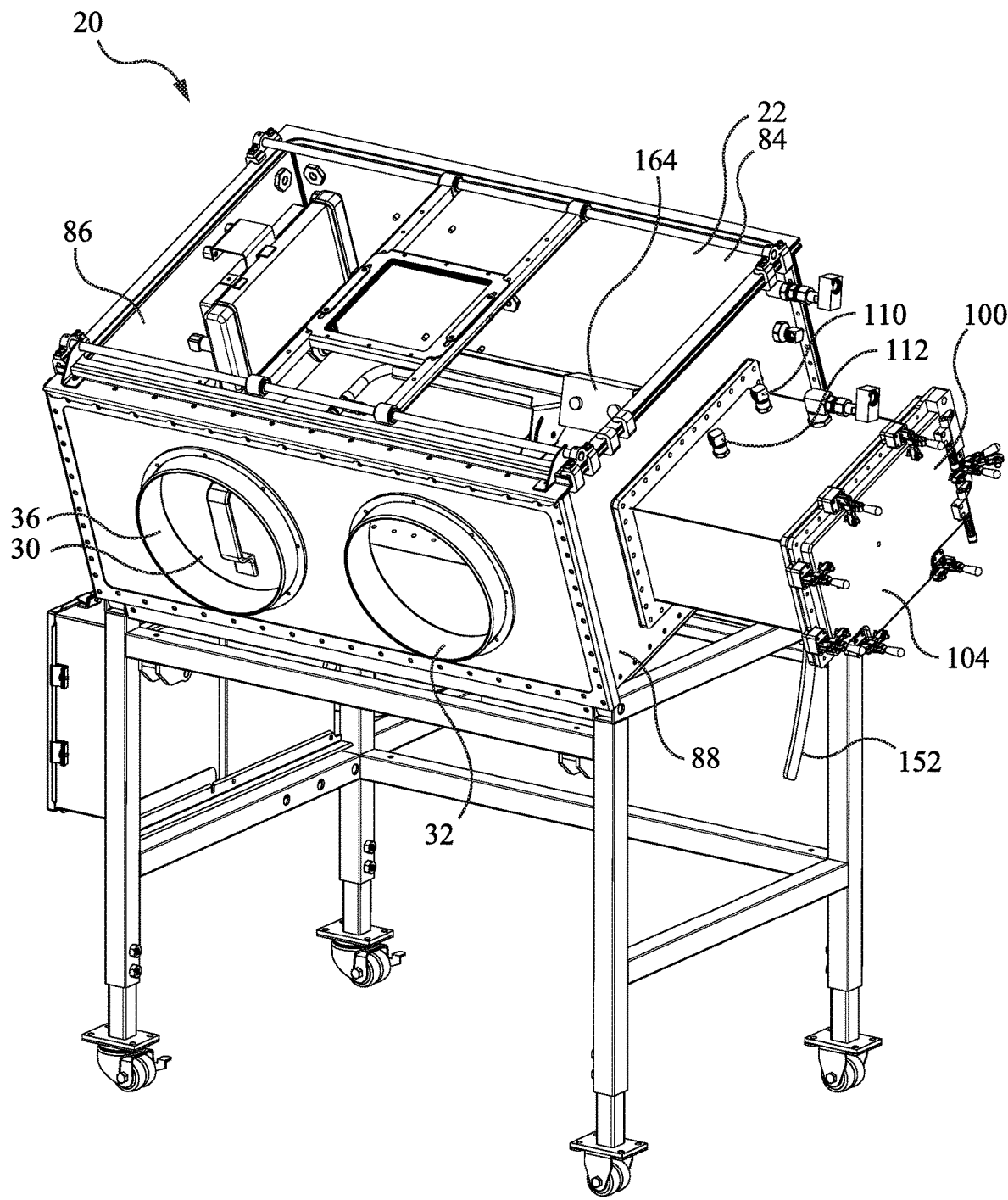
FIG. 1d shows a perspective view of the glove box of FIG. 1a from in front and to the left.
Figure 1E:
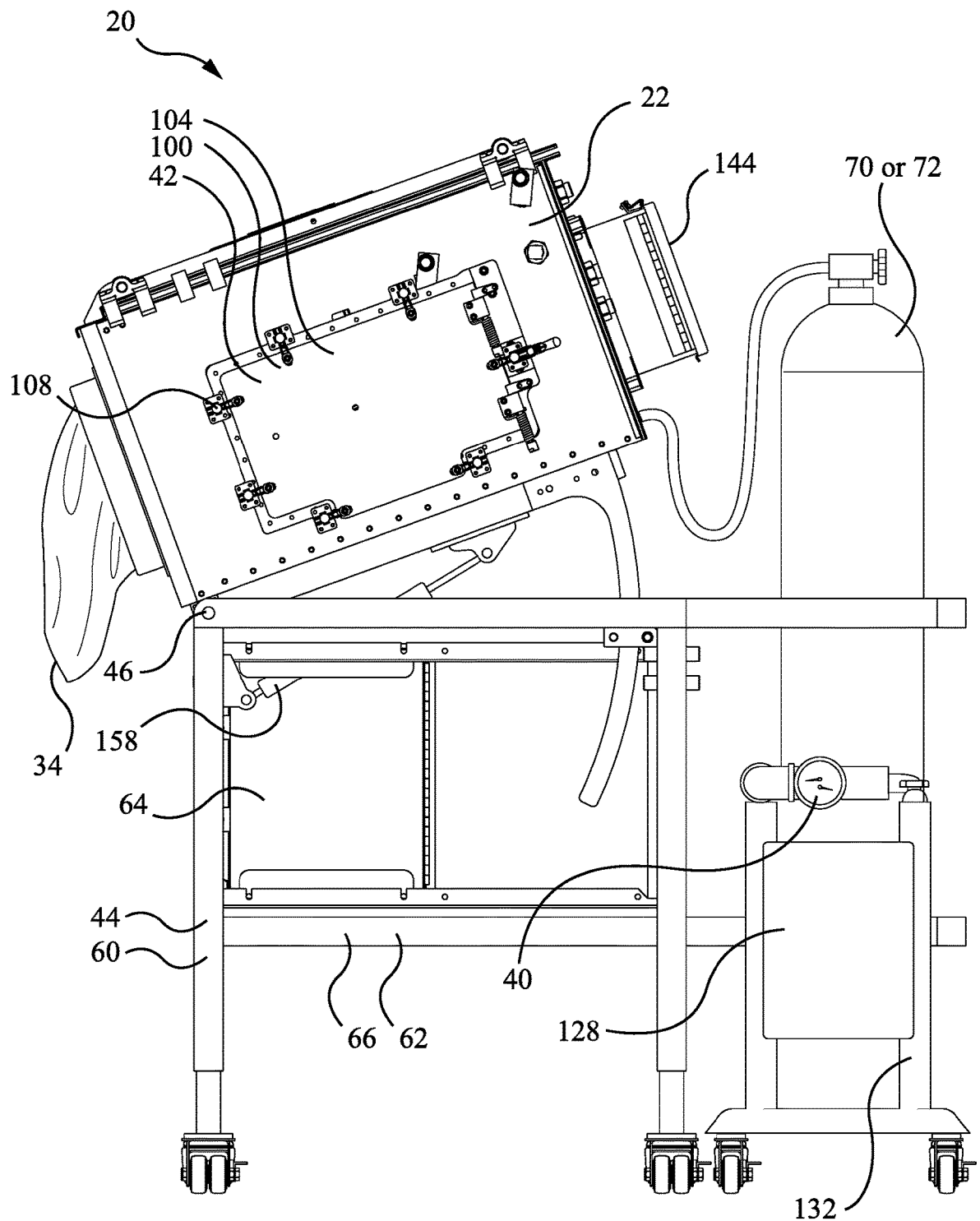
FIG. 1e shows a perspective view from the left side of the glove box of FIG. 1a, sowing also an associated heat exchanger positioned behind the glove box.
Figure 1F:
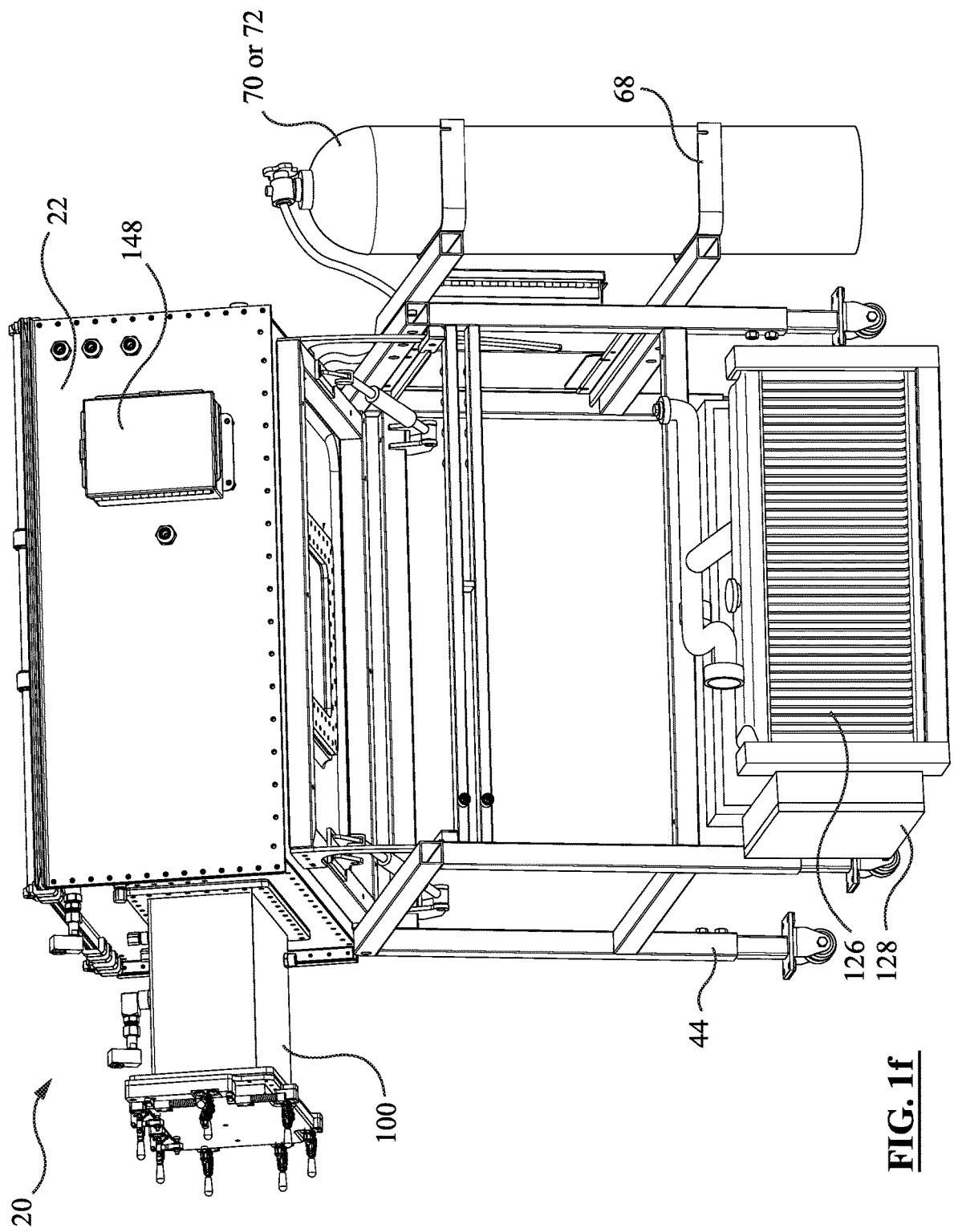
FIG. 1f is a perspective view from behind showing the heat exchanger of FIG. 1e.
Figure 2:
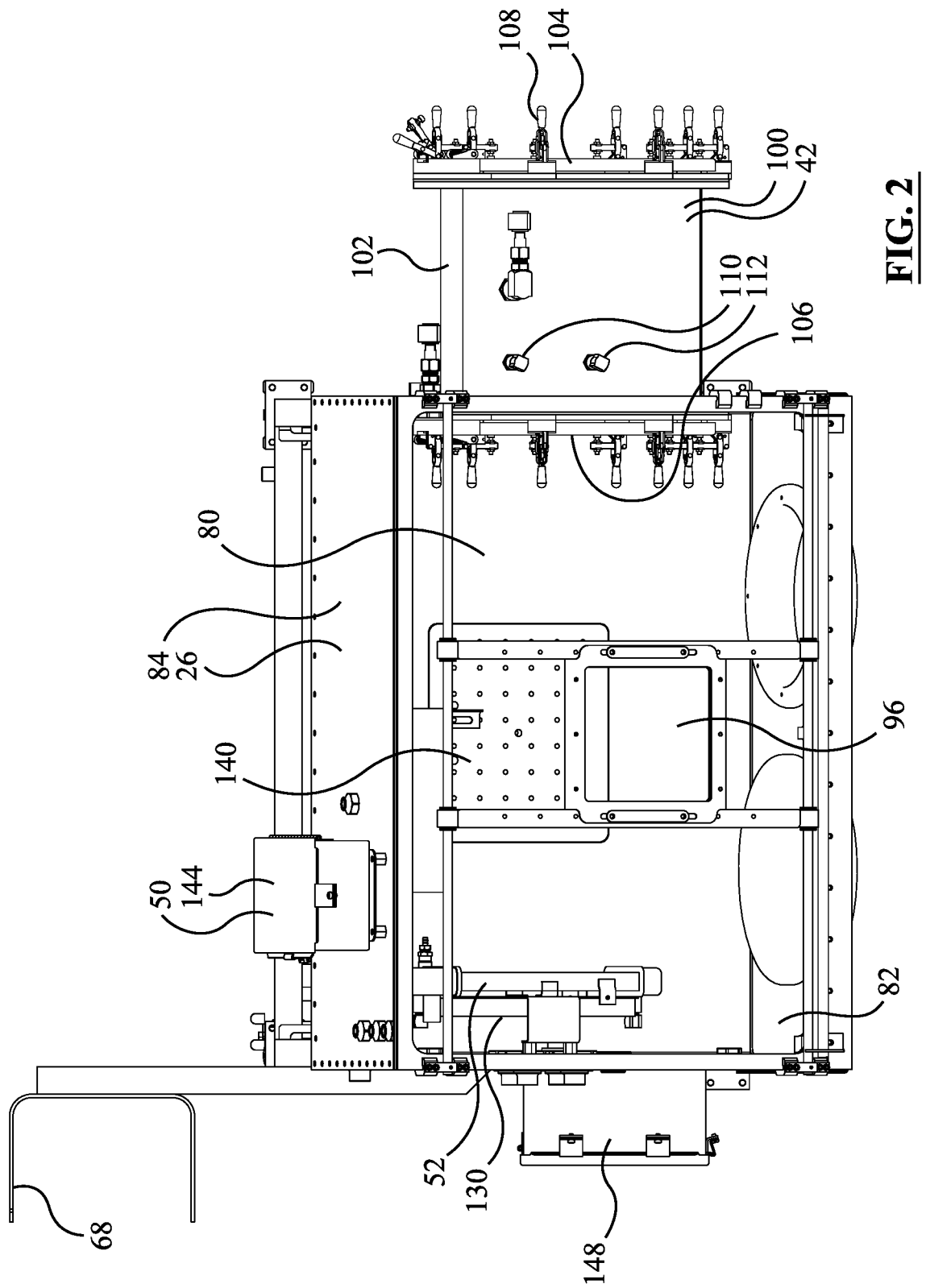
Figure 3:
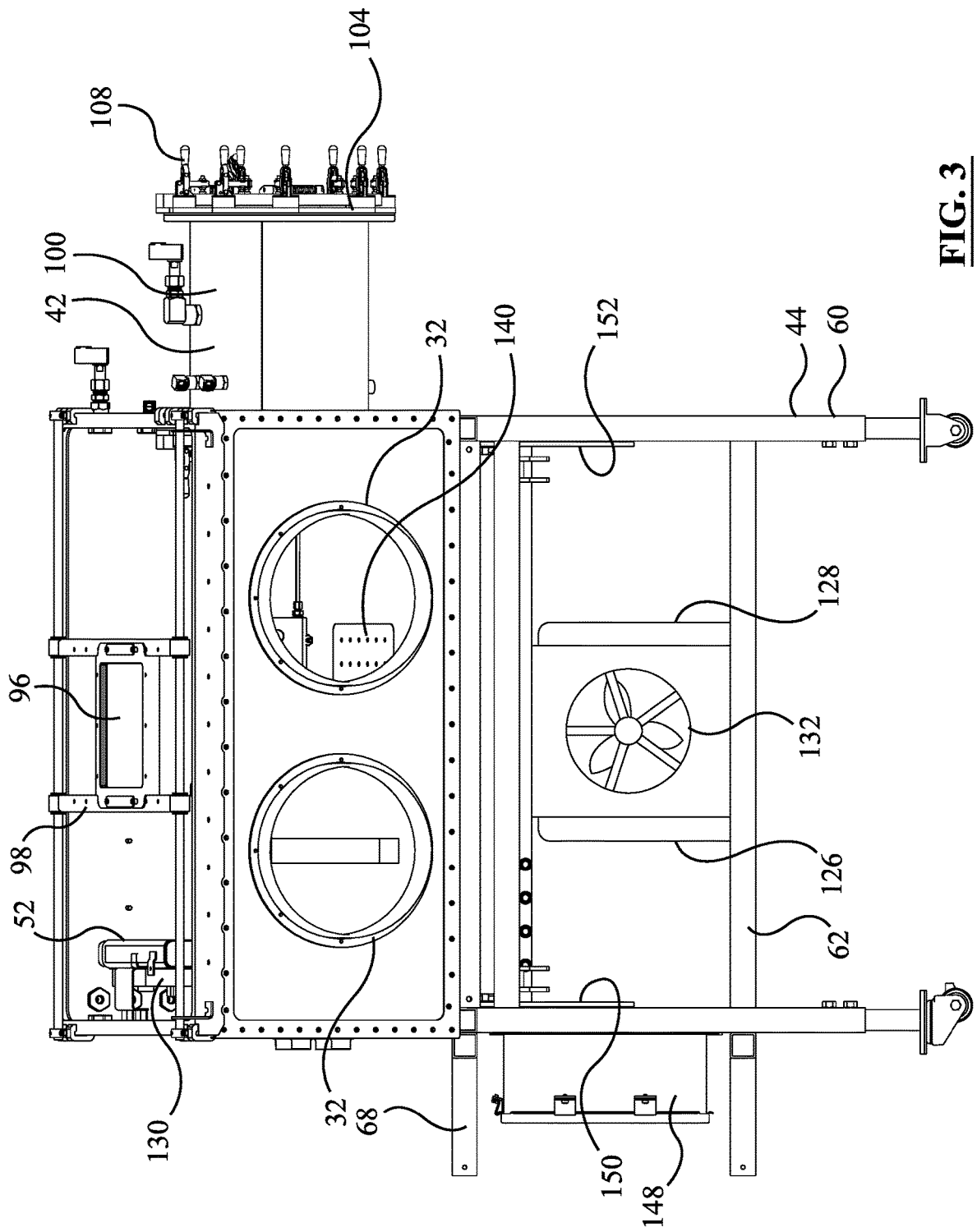
Figure 4:
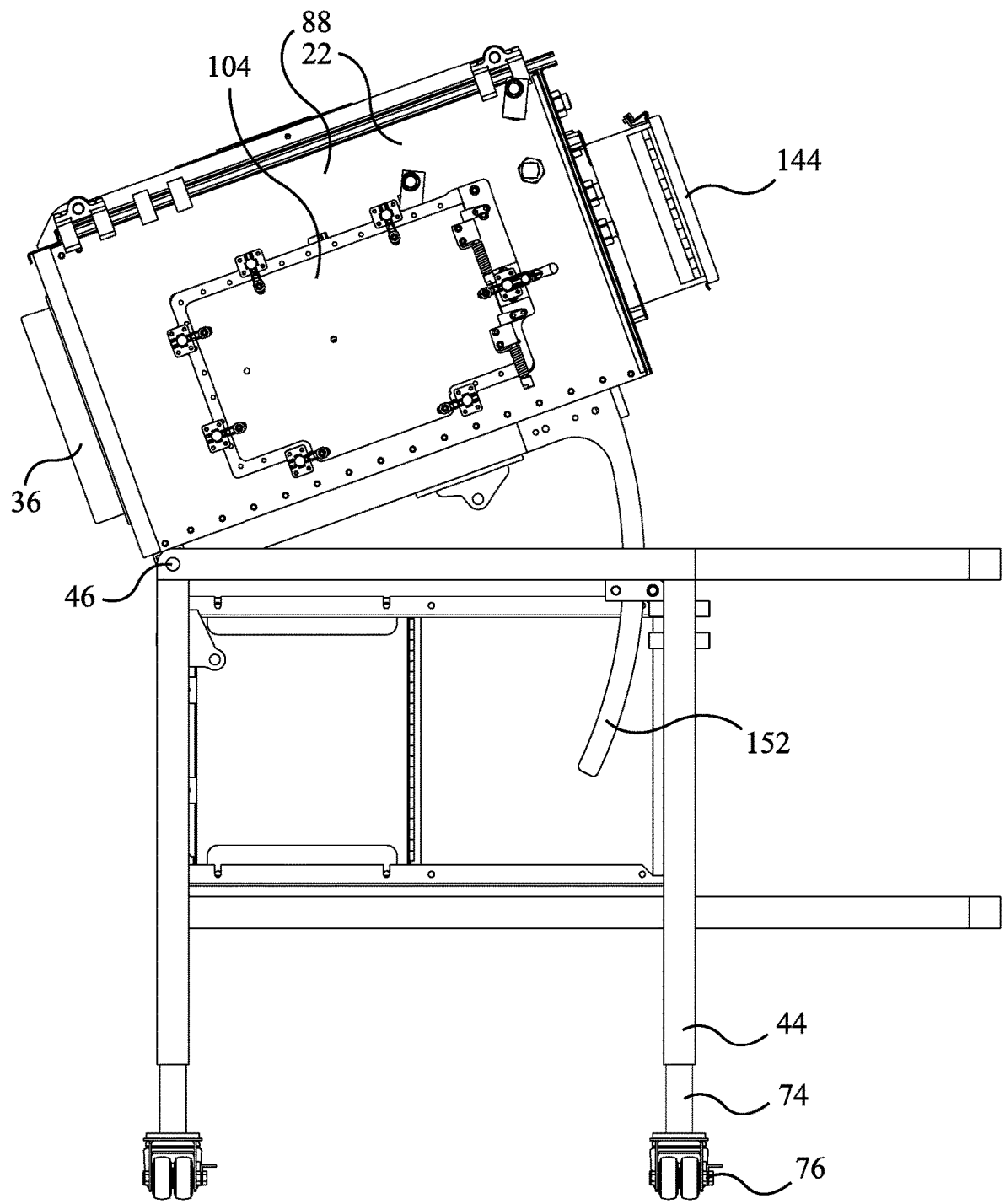
Figure 5:
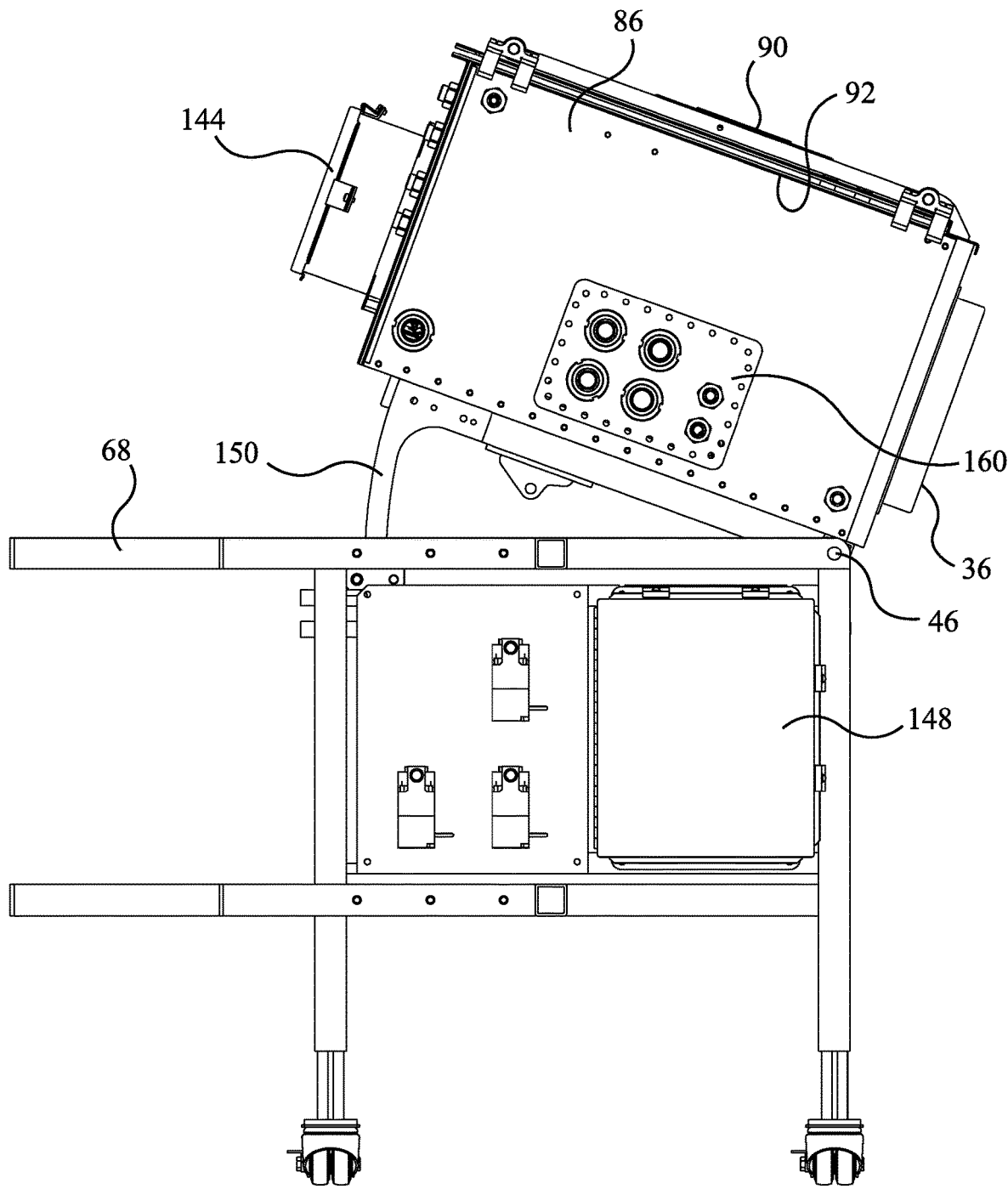
Figure 6:
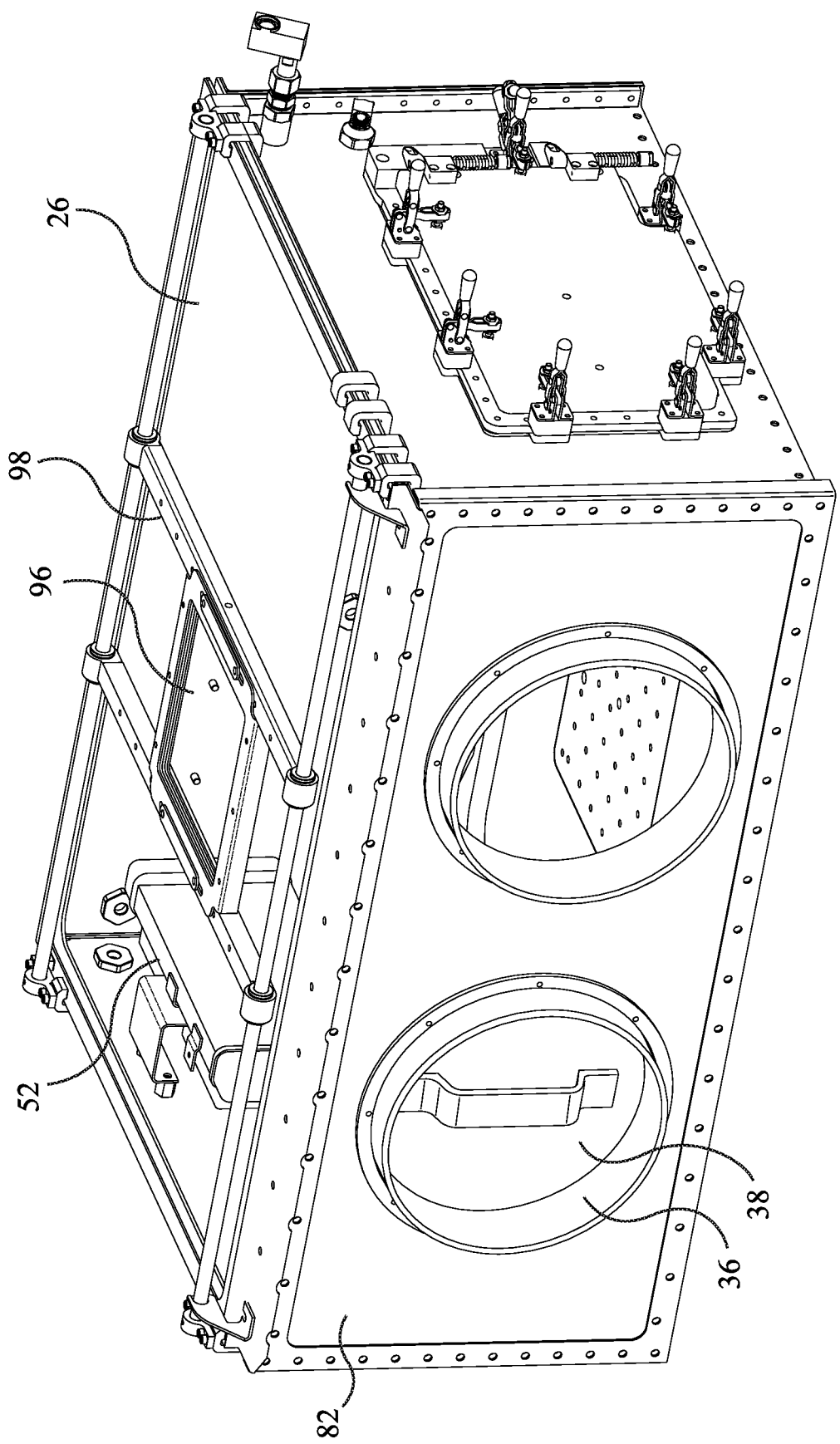
FIG. 6 is a perspective view of the glove box of FIG. 1a less its mounting base.

The description that follows, and the embodiments described therein, are provided by way of illustration of an example, or examples, of particular embodiments of the principles of the invention. These examples are provided for the purposes of explanation, and not of limitation, of those principles and of the invention. In the description, like parts are marked throughout the specification and the drawings with the same respective reference numerals. The drawings may be understood to be to scale and in proportion unless otherwise noted. The wording used herein is intended to include both singular and plural where such would be understood, and to include synonyms or analogous terminology to the terminology used, and to include equivalents thereof in English or in any language into which this specification many be translated, without being limited to specific words or phrases.

For the purposes of this description, a Cartesian frame of reference may be employed. In such a frame of reference, the long, or largest, dimension of an object may be considered to extend in the direction of the x-axis, being the longitudinal axis and the main axis of rotation. The height of the object is measured in the z-direction, and the lateral distance from the central vertical plane is measured in the y-direction. Unless noted otherwise, the terms "inside" and "outside", "inwardly" and "outwardly", refer to location or orientation inside the housing of the apparatus. In this specification, the commonly used engineering terms "proud", "flush" and "shy" may be used to denote items that, respectively, protrude beyond an adjacent element, are level with an adjacent element, or do not extend as far as an adjacent element, the terms corresponding conceptually to the conditions of "greater than", "equal to" and "less than".

In the Figures, a controlled environment chamber assembly, such as may be referred to as a glove box, is shown generally as 20. It includes a frame or wall structure, or enclosure 22. The wall structure of enclosure 22 is hollow, there being an enclosed volume or space, or accommodation, or chamber 24 defined there within. Chamber 24 is a working chamber, and to the end of permitting the operator to see what he or she is doing, enclosure 22 has a viewing portion, or window 26. Given that the apparatus is a glove box, enclosure 22 has first and second access penetrations 28, 30, and first and second, or, more particularly, left-hand and right-hand gloves, or gauntlets, 32, 34, mounted respectively thereto, and into which, naturally, an operator may place their hands in the usual manner. Gauntlets 32, 34 extend into work chamber 24. The cuffs 36 of gauntlets 28, 30 are mounted to outwardly extending flanges 36 that surround penetrations 28, 30. When not in use, penetrations 28, 30 are sealed from the inside by removable port covers 38.

Since glove box 20 is intended to permit work to be conducted in an environment having a controlled atmosphere, glove box 20 is provided with conduits, or hoses, or ductwork, indicated generically as piping 40 that permits gases to be supplied to or extracted from chamber 24, by which means a selected atmosphere may be established within chamber 24. Given the purpose of glove box 20, and the general undesirability of removing viewing window 26 each time it is desired to change a work piece, glove box 20 has an external access 42 by which to introduce a work piece (or tools, or consumables, such as welding electrodes, and so on) into chamber 24 prior to processing, and by which to extract the work piece after processing.

Glove box 20 has a support apparatus, or stand, or suspension, or frame, or mounting, or undercarriage, indicated generally as 44. Enclosure 22 is movably mounted to undercarriage 44. In the embodiment shown, enclosure 22 is hingedly mounted, as at hinge 46, such that it has a rotational degree of freedom of motion relative to undercarriage 44. Accordingly, enclosure 22 has an angular adjustment be which it can be tilted relative to undercarriage 44, thereby tilting the viewing panel, window 26, and tilting the access of gauntlets 32, 34.

Inside enclosure 22 there is a workstand 48 upon which the workpiece may sit, or to which the workpiece may be secured, during processing. Glove box 22 is also provided with an environmental control system, indicated generally as 50, which may include a heat exchanger 52, mounted within chamber 24, and through which gases contained within chamber 24 may be encouraged to pass. Environmental control system 50 may further include piping connected to deliver heating or cooling fluid to galleries, or passages, formed in work stand 48. Environmental control system 50 is operable to govern temperature within chamber 24.

As it may be inconvenient or clumsy for the operator to remove his or her hands from gauntlets 32, 34 during processing, controls 56 are located inside chamber 24 within the reach of gauntlets 32, 34 so that parameter adjustments can be made while wearing the gauntlets. A duplicate set of controls 58 is also located outside chamber 24, to permit control from either inside or outside chamber 24, as may be convenient.

The features identified above may be considered in greater detail, commencing with undercarriage 44, followed by enclosure 22, access 42, workstand 48, environmental control system 50, and the controls, be they inside, as at 56, or outside, as at 58.

Undercarriage 44 may have the general nature of a stand or frame upon which to mount enclosure 22. In the example shown, undercarriage 44 is an all welded steel structure. It may include a set of vertical, or predominantly vertically extending posts or columns or uprights, 60. Upright 60 could be a single vertical pillar or stand. In the embodiment shown there are four uprights 60 arranged as corners of a rectangle. Undercarriage 44 also includes lateral bracing, or braces, or cross-members 62 between the various pairs of uprights 60. There is an upper set of cross-members 64 defining a rectangular frame at the upper end of undercarriage 44, and a lower set of cross-members 66 at a mid-level height part way along uprights 60. The lower cross-members need not run along the front side, such that undercarriage 44 may be open underneath, like a desk. Undercarriage 44 may also include a frame, stanchion, cradle, arm, or accommodation 68 at which to secure gas reservoirs 70, 72, such as may contain, and be used to supply, inert gases such as argon, or non-participating gases such as $CO_2$. Further, undercarriage 44 may include feet 74. In the embodiment shown, each foot 74 is axially adjustable relative to its associated upright 60, such that the height of apparatus 20 may be adjusted. In that regard, in the embodiment shown each foot has a shank nested within its upright 60 in a telescoping relationship. Glove box 20 may be movable, such that it may be transported to a location where, for example, a repair service is required. To that end, an adjacent pair of, or all of, feet 74 may have a wheel, 76, which may be a caster wheel.

Enclosure 22 may have the form of a generally rectangular sided open-topped box 78, having a bottom or base wall 80, a front wall 82, a rear wall 84, a left hand end wall 86 and a right hand end wall 88, all of which co-operate to define open-topped box 78. Enclosure 22 may have a top wall, of which a viewing panel, such as window 26 may form a portion. In the embodiment illustrated, window 26 forms substantially the entirety of the top wall, and is set in a bezel, or external peripheral mounting frame, 90. Open topped box 78 has an upper rim, or frame, or lip, or peripherally extending flange 92 that mates with frame 90. A seal, such as an O-ring seal, 94 is captured between flanges 92 and frame 90. Window 26 may be provided with an optical filter, or smoked glass window panel 96. Panel 96 may be mounted on a pantograph, movable articulated arm, or on a set of rails 98 permitting x-y adjustment. Panel 96 is provided for use when the glove box 20 is being used for a welding activity or procedure.

The front wall 82 or face of enclosure 22 most typically has the working access port or porting or penetrations 28, 30. Removable obstructing panels, or port covers 38 are provided on the inside of front wall 82, and may be pulled into place when retracting the gauntlets. Port covers 96 may be put in place, and sealed, when the air is evacuated from chamber 22 and a flushing atmosphere of an inert gas or $CO_2$ is introduced. When chamber 22 is again at only a small pressure differential from ambient, port covers 96 are opened.

External access 42 is mounted to one or the other of the left or right hand walls 86, 88. In this description, the choice of left or right is arbitrary. In the illustrations, access 42 is mounted to the right hand wall, there being a corresponding penetration trough the right hand wall. Access 42 could be mounted to the base wall or to the rear wall. In any event, access 42 as shown is, or includes an air-lock 100, having a generally rectangular body 102 having an external closure or hatchway or port 104 and an internal hatchway or port 106. Each of the internal and external hatches has an array of securements, indicated as clamps 108 by which to seal either end of the passageway through body 102. Body 102 has gas supply and evacuation fittings 110, 112. In operation, one port is opened; a work piece, or batch of work pieces, or tool, or consumable item such as an electrode, or box of electrodes, is placed inside the antechamber, or passageway, defined by body 102; the outside door is secured; air is evacuated from body 102 through evacuation fitting 112 and, typically, replaced by an inert gas, such as Argon, provided through fitting 110 to match the prevailing atmosphere within chamber 24. The interior port is then opened, and the objects are moved into the chamber 24. Where objects are to be removed, the procedure is reversed. In this way, objects can be introduced into chamber 24, or removed therefrom, without so frequently having to evacuate and purge chamber 24 using a vacuum pump and supplied inert or non-participating gases. This may tend to save time and gas consumption.

Environmental control system 50 of chamber 24 may include main inlet and outlet 120, 122 fittings by which to introduce or to evacuate gases. Inlet fitting 120 may typically be connected to a gas manifold 114 connected to an inert gas cylinder (e.g., 70) or a typically non-participating gas, such as Nitrogen or $CO_2$ (e.g., 72). Outlet fitting 122 may be a vent, where flushing relies merely on the relative buoyancy of gases, or it may be connected to a vacuum pump 116, where one gas is evacuated, or largely evacuated, before another gas is introduced The wall penetrations for these fittings may be located in the opposite end wall, namely left hand wall 86. There may be more than one such fitting, depending on the relative densities of the gases being introduced and extracted. In the manner of a submarine's ballast tanks, the lighter (i.e., less dense) fluid will be introduced or extracted at the top, and the heavier (i.e., more dense) fluid is extracted or introduced at the bottom.

Environmental control system 50 may also include one or more internal heat exchangers 124 and an externally mounted heat exchanger 126, the two heat exchangers being connected by suitable piping, that piping passing through the wall structure of enclosure 22 at sealed wall penetrations. There may typically be a pump 128 to move a working fluid between the two heat exchangers. There may be a nozzle, and there may be check valves in the various lines to prevent backward flow. There may be an air mover, such as a fan or blower 130, located within chamber 24, an operable to urge flow of the internal atmosphere through heat exchanger 124. Similarly, there may be an external fan or blower 132 mounted to urge ambient air through external heat exchanger 126. External heat exchanger 126 may be mounted to undercarriage 44, or it may be mounted on a separate frame or stand. Environmental control system 50 may also include a more active heating or cooling system, such as a heat pump, typically a vapour cycle heat pump. In such a system, internal heat exchanger 124 would be an evaporator, and external heat exchanger 126 would typically be a condenser. In a further alternative, internal heat exchanger 124 may be supplied with a chilled (or, possibly, heated) liquid feed line, such as a cold water supply line, with heated return water being either discarded or cooled in heat exchanger 126.

Workstand 48 of glove box 20 is an apparatus to which a workpiece can be mounted for processing. Workstand 48 may be, or may include, a flat plate, indicated as a tooling plate 140. Tooling plate 140 may have a clamp, or jig, or other fixture having or defining an accommodation or seat for the work piece. It may include an upstanding member 142, be it a wall or arm or frame directed toward that same end. Workstand 48, or any of its components, may be electrically conductive, or may have an electrical connection by which either direct or alternating current may be applied. Workstand 48 may include an array of threaded holes or profiled channels to which clamps or fasteners may be mounted, thereby to provide a securement for jigs, of fittings, or tool holders for the workpiece or for processing equipment or tooling. Furthermore, workstand 48 may be provided with cooling fittings, passages or galleries, indicated notionally as 142, by which, and through which, liquid coolant may be supplied. Such fittings may be connected to an external coolant source (e.g., a cold water tap) through yet another wall penetration. Workstand 48 may also be provided with a temperature sensor, or thermostat. A temperature control unit 144 may be mounted on rear wall 84, and is connected to operate the various elements of the environmental control system, as may be. There may also be a tool holder 146, in which to mount a tool such as a welding electrode holder. Tool holder 146 may be an adjustable, multiple-degree-of-freedom tool holder permitting variation of placement and orientation of the tool relative to the workpiece. Tools may also be hand held, and hand operated by the user.

As indicated above, enclosure 22 is movably mounted to undercarriage 44. In the embodiment shown, enclosure 22 is hinged long its front edge at the tops of the left and right uprights 60. At the rearward end or edge of enclosure 22 are mounted a pair of left and right hand rods, or struts, or supports 150, 152, and corresponding clamps 154, 156. Left-hand and right-hand gas springs 158 are used to counter-balance enclosure 22. Supports 150, 152 may be rigid members, and may have the shape or profile of a sector of a circle. Enclosure 22 may be raised and lowered pneumatically, and, when adjusted, clamped in position by securing supports 150, 152 to the top frame side cross-members with clamps 154, 156.

Enclosure 22 has a set of electrical control circuit interface fittings 160 mounted in left hand wall 86. Rather than making repeated openings in wall 86, several fittings may be mounted on a common plate, as at 146. An electrical control box is mounted to undercarriage 44 at 148.

One use for glove box 20 may be for welding or other high temperature melting of fusing processes. To that end, a welding applicator, or handle, or electrode holder 162 may be provided inside chamber 24. Electrical power connections for holder 162 are provided through fittings 160, and may include multiple power sources, whether AC or DC, whether for providing a main welding current, or for powering accessories such as oscillator motors, sensors, controls, ventilators and so on. It may be expected that the electrode mounted in holder 162 will have opposite polarity to workstand 48. The use of glove box 20 permits the welding processes to occur in a controlled, typically non-oxidizing, atmosphere.

Glove Box 20 has user-operable controls 56 located within chamber 24, within reach of gauntlets 32, 34 to permit the operator to adjust variable process parameters. Controls 56 may include controls to adjust voltage, current, discharge capacity, or discharge pulse duration. Control 56 may also include controls to adjust shielding gas flow, and chamber temperature. To the extent that either workstand 48 or holder 162 vibrates, controls 56 may include a frequency adjustment. Chamber 24 may have a supply rack in which alternate types of electrode rod are held. The voltage, current and charge suitable for different welding rod deposition materials may vary. The operator is then able to adjust between coating layers without removing the operator's hands from gauntlets 32, 34. Glove box 20 may include a duplicate set of controls 166 mounted outside enclosure 22.

The operator may be able to determine the settings of the various controls 56 by feel inside chamber 24. Alternatively, or additionally, glove box 20 may have an external visual display 168, that is mounted outside chamber 24, and so protected from damage during a welding process, while still being visible to the operator.

Figure 7:
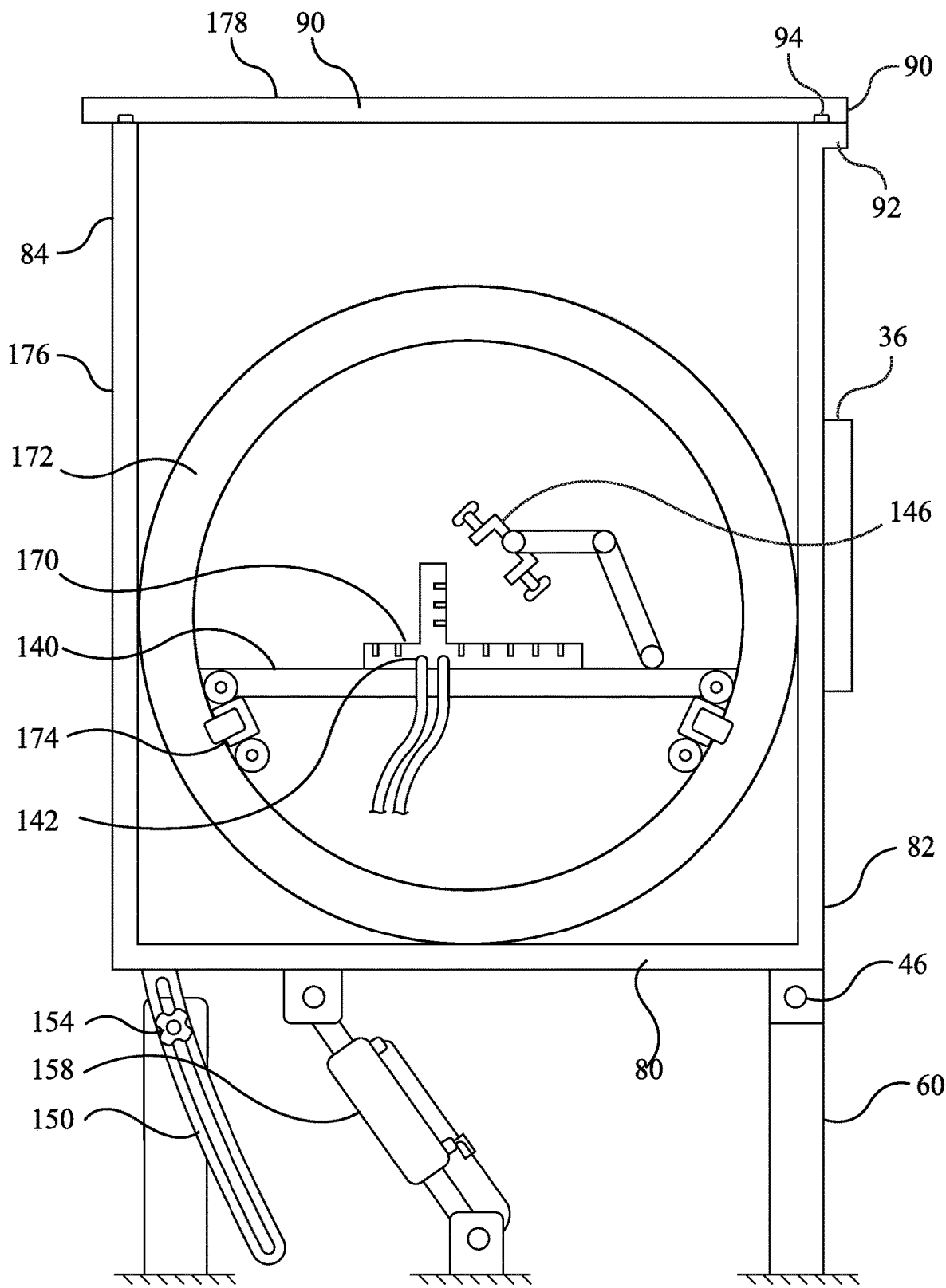

In the alternate embodiment of FIG. 7, the workstand, 170 is movably mounted to an internal ring 172 such that the angular orientation of workstand 170, and therefore of a workpiece mounted thereto, is variable. When the desired angle of tilt is obtained, workstand 170 may be clamped in a fixed orientation for processing using clamps 174. Thus enclosure 176 can be tilted to tilt the viewing angle of window 178, and the workpiece can also be tilted. In some circumstances the tilt may be such as to make the surface of workstand 170 horizontal and level notwithstanding that enclosure 176 is tilted. The adjustment mechanism may be motorized, and operable by the operator using either internal or external controls.

Figure 8A:
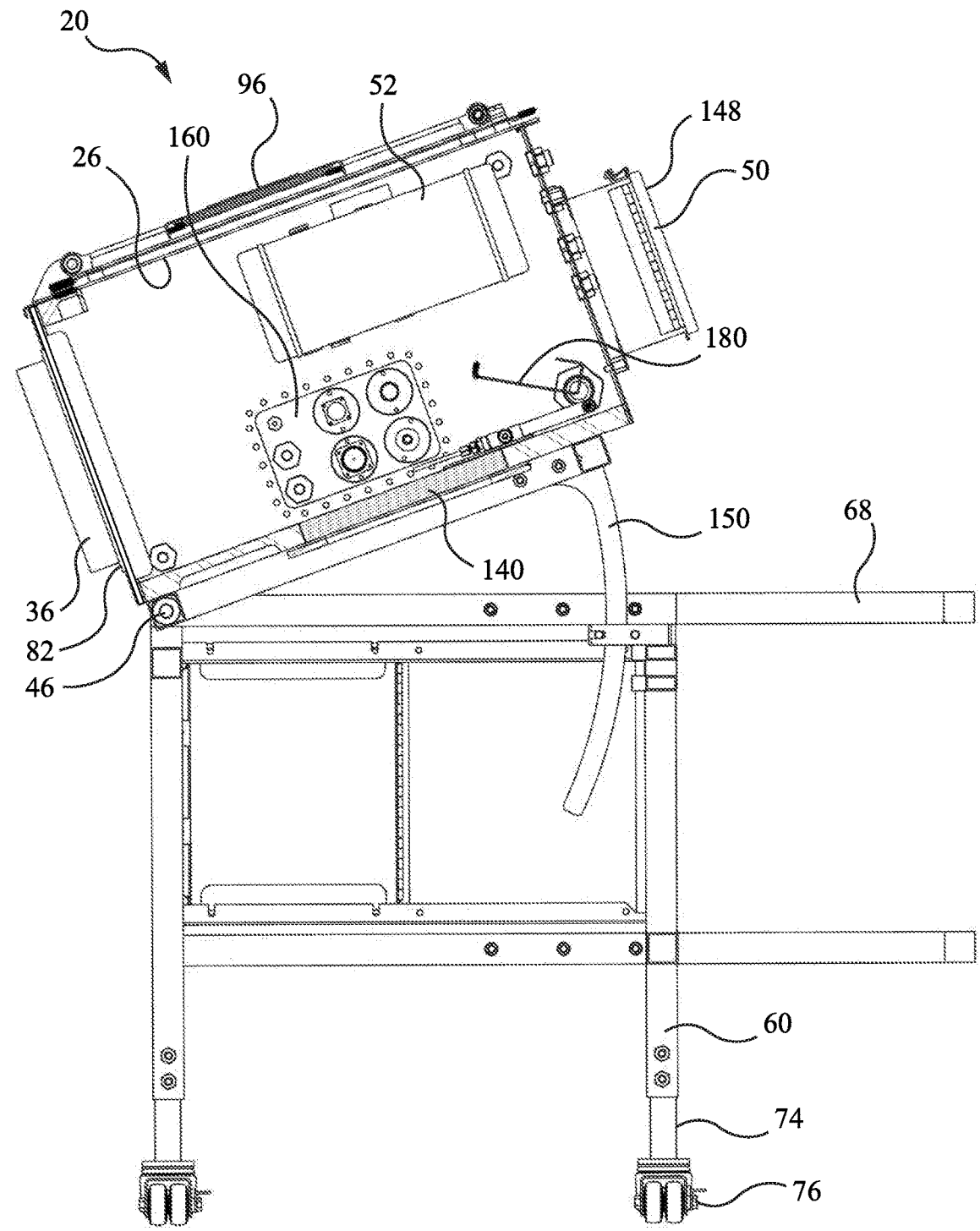
Figure 8B:
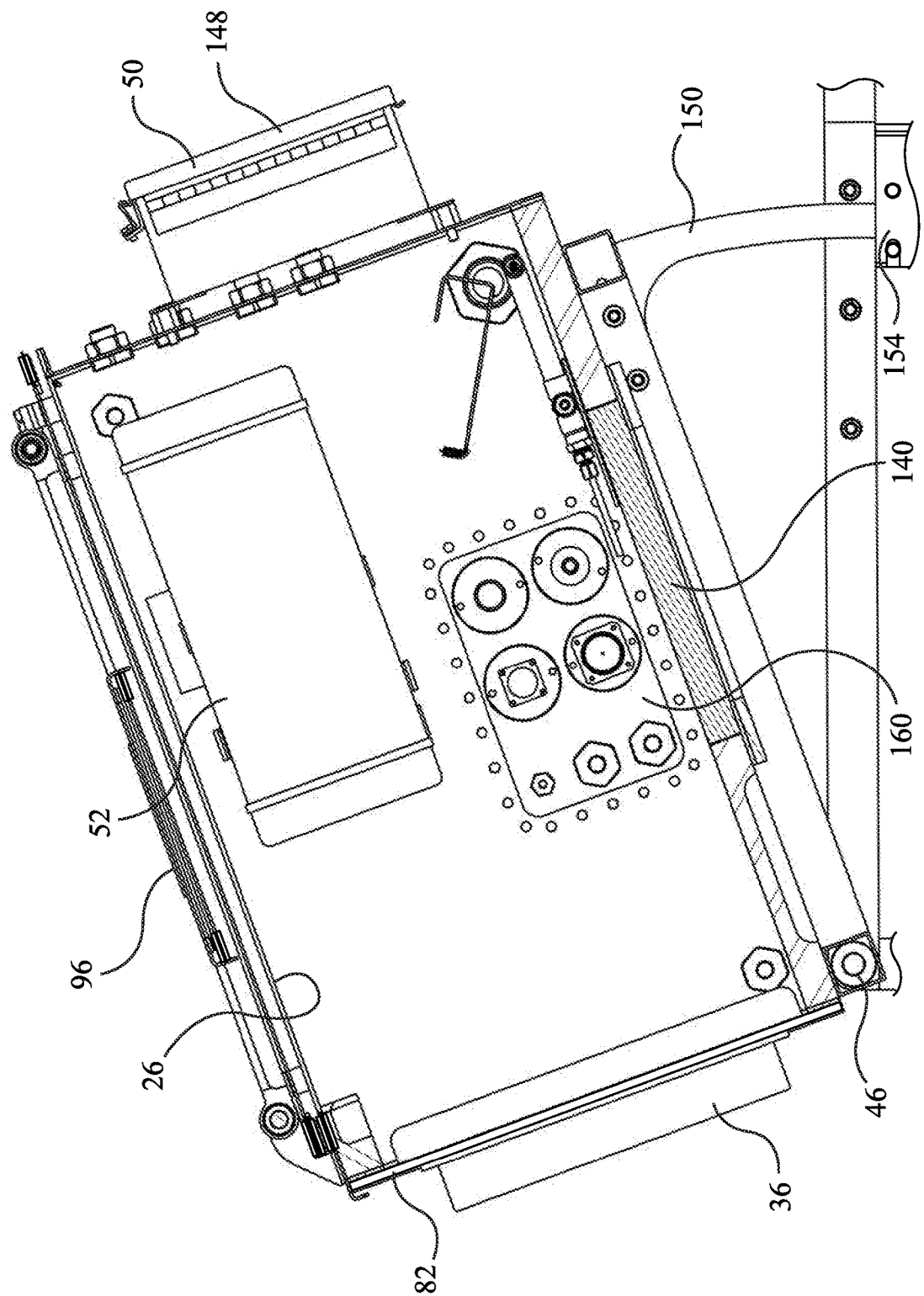

Similarly, or additionally, in FIG. 8a and in the enlarged detail of FIG. 8b, the inside of chamber 24, including an angularly adjustable tool stand, or tool holder, or shelf 180, upon which to place, for example, tools, or additional work pieces, or welding electrodes or other consumable items so that they will not roll away.

Figure 10:
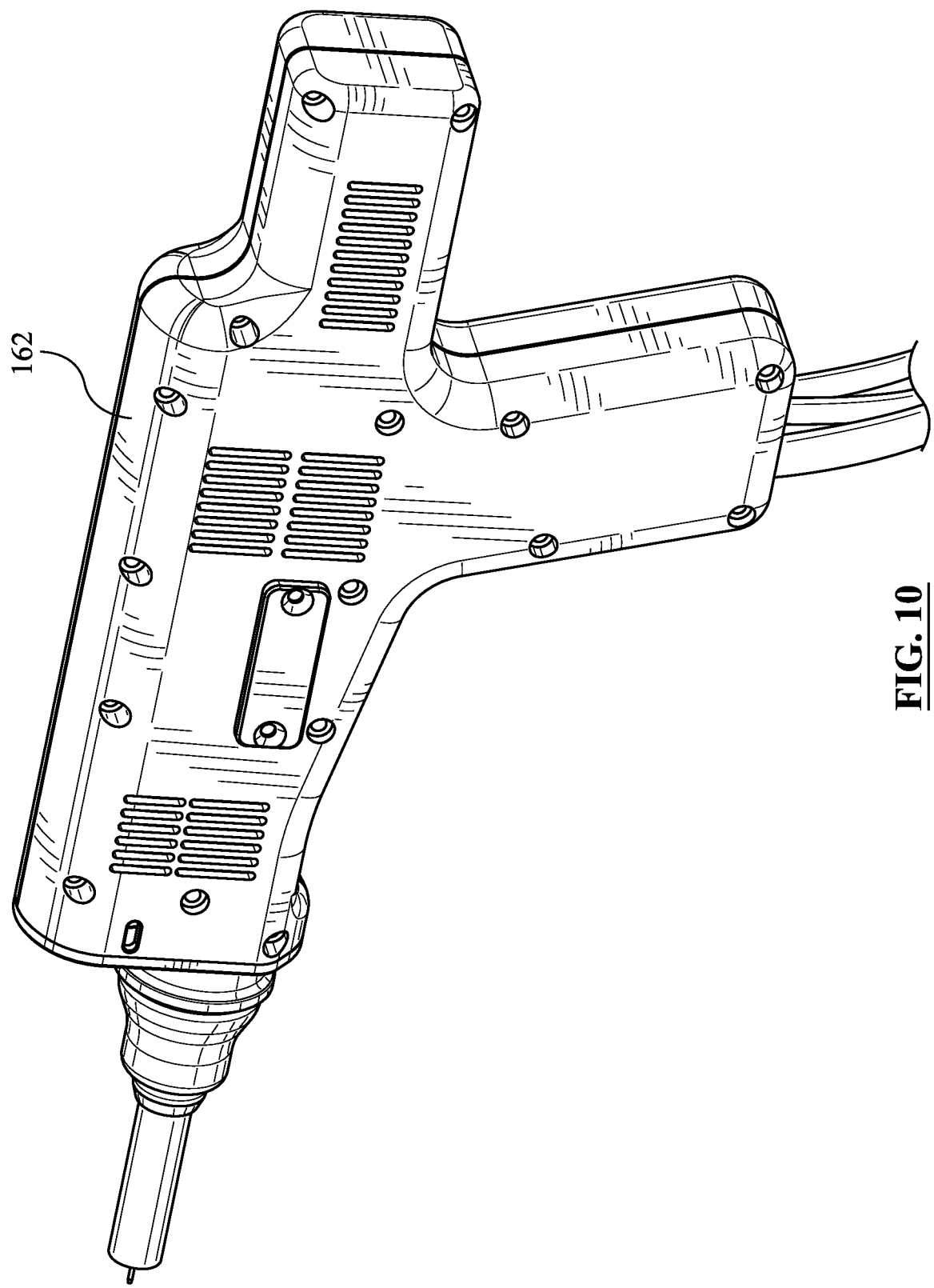

By their nature, when a glove box such as glove box 20 is to be used for an activity such as welding or brazing, where it is desired purge the usual ambient oxygen containing atmosphere, and to replace it with an inert or non-participating atmosphere instead, e.g., so as to reduce the likelihood on undesirable oxides contaminating the weld, the purging process may first require drawing a vacuum in the chamber to purge the air, and then introducing the desired non-participating gas to flush the chamber. Even with a large vacuum pump, this is typically quite a slow process involving a substantial transition time. If the operator wishes to process several work pieces per day, the rate of work may be reduced by the length of time it takes to purge and flush the chamber. Also, by its nature, a production process may involve the introduction of new work pieces and the removal of finished work pieces, as well as the introduction of consumables as processing occurs. It may also involve the introduction or changing of tools, such as welding electrode holder 162 shown in FIG. 10. The process may be hastened by reducing the volume to which vacuum extraction and gas purging may be applied. Further, the cost of supplying purging gases for a repetitive production process may not be insignificant over time. It may be possible to reduce both the turn-around time and the use of purging gases by reducing the volume to be evacuated, purged, and flushed.

Figures 9A, 9B:
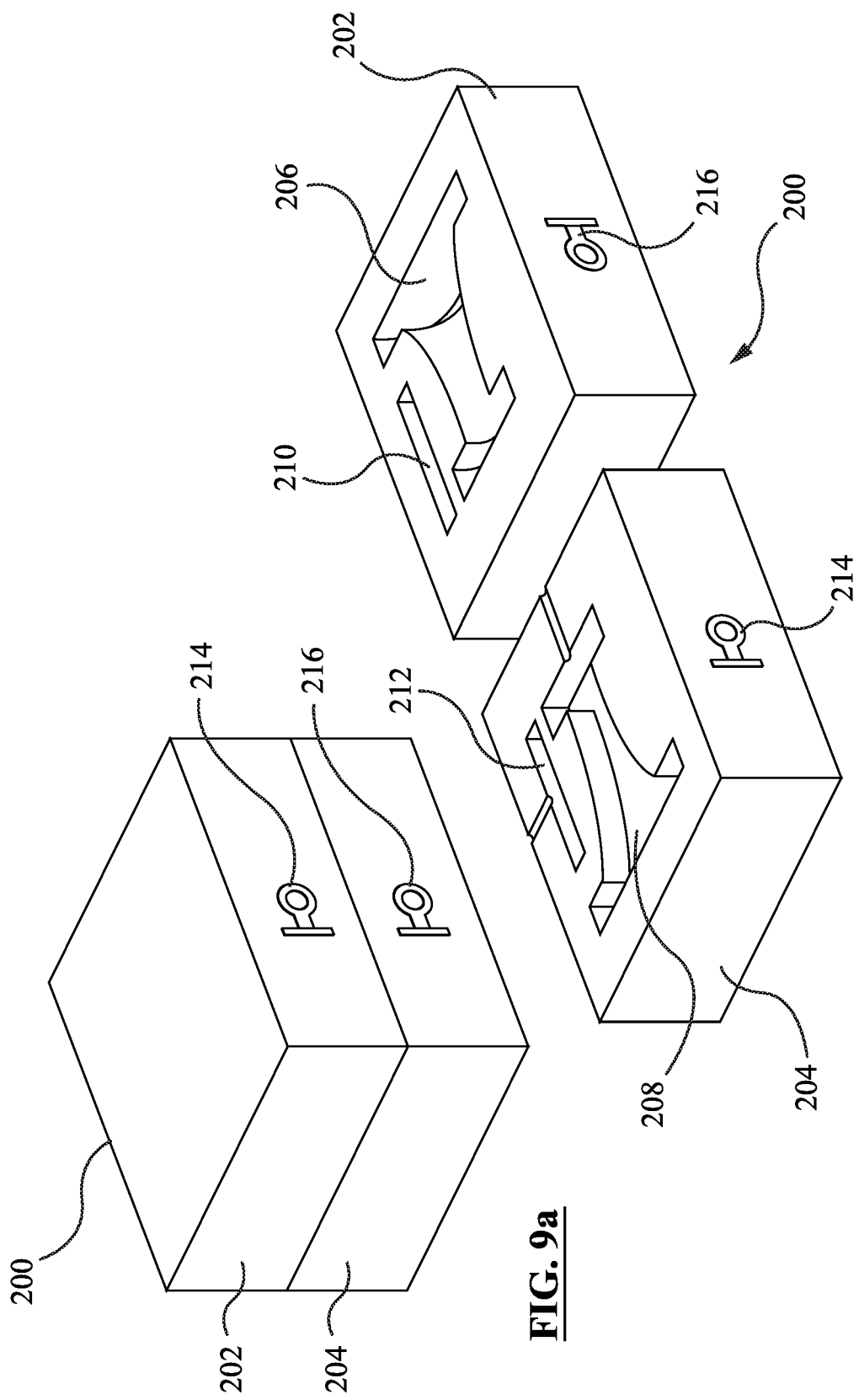
FIG. 9a is an isometric view of a transfer case for use with the glove box of FIG. 1a in the closed condition.
FIG. 9b is an isometric view of the transfer case of the glove box of FIG. 9a in an open position.

To that end, FIGS. 9a and 9b relate to a casing, or carrier, or transfer case, indicated generally as 200, and having first and second halves 202, 204. Carrier 200 has external length, width, and depth dimensions closely corresponding to the inside length, width, and depth of the antechamber, or air lock 100. First and second halves 202, 204 are provided with respective internal cavities 206, 208, 210, 212. Cavities 206 and 208 may combine to form a female mold, or cavity, corresponding closely to the shape of a work piece to be processed. Cavities 210, 212 may correspond to the shape of tools or consumables to be used in processing the corresponding workpiece. Transfer case 200 is not sealed, and cavities 206, 208, 210 and 212 communicated with the outside, such that when air lock 100 is purged, cavities 206, 208, 210 and 212 are also purged. By occupying the balance of the volume of air lock 100, transfer case 200 reduces the time required to purge the air lock, and the amount of inert or non-participating gas that must be used to purge the chamber. Transfer case halves 202, 204 have external grips, or bails, or handles 214, 216 which permit them to be opened. Handles 214, 216 may be spring mounted and may seat in external recesses such that they lie shy of the outside profile of the sides of transfer case 200, thereby allowing the outsides of the box to fit more closely in air lock 100.

Although only one pair of workpiece cavities 206, 208 is shown, it may be that a process may be more efficient, in terms of both transition time and gas use where carrier 200 has accommodations for several work pieces. In use, one batch of work-pieces can be introduced, and placed on shelf 180, while another batch of finished work-piece can be placed in the now-empty cavity, or cavities, of transfer case 200. Similarly, cavities 210, 212 may be used to introduce enough consumable materials, such as electrodes, for several work pieces, and may include work pieces of different compositions, corresponding to different coating layers. That is, it may be that in coating one type of substrate, be it steel or copper or some other material, it may be desirable to start with a first coating layer. That first coating layer may be of nickel, for example. The first coating layer may be followed by a second coating layer, of a different material, be it a carbide, such as titanium carbide or titanium di-boride; or it may be another metal layer such as a layer of molybdenum. There may be a third layer, or such additional layers as may be, of yet different composition, or compositions. Various coating materials may be used according to the desired process and the desired final finish properties. The use of transfer case 200 may tend to permit these processes to occur with less volumetric exchange.

The embodiments illustrated and described above illustrate individual non-limiting examples in which the principles of the present invention are employed. It is possible to make other embodiments that employ the principles of the invention and that fall within the following claims. To the extent that the features of those examples are not mutually exclusive of each other, the features of the various embodiments may be mixed-and-matched, i.e., combined, in such manner as may be appropriate, without having to resort to repetitive description of those features in respect of each possible combination or permutation. The invention is not limited to the specific examples or details which are given by way of illustration herein, but only by the claims, as mandated by law. The claims are to be given the benefit of purposive interpretation to include equivalents under the doctrine of equivalents.

Although the various embodiments have been illustrated and described herein, the principles of the present invention are not limited to these specific examples which are given by way of illustration, but only by a purposive reading of the claims.

I claim:

1. A glove box comprising:
   an enclosure having a working chamber defined therewithin;
   said enclosure having a viewing portion;
   said enclosure having at least one gauntlet extending into the working chamber;
   piping operable to permit a selected atmosphere to be established within said chamber;
   an access by which to introduce a work-piece into said chamber; and
   said enclosure having an angular adjustment by which to tilt at least one of said gauntlet and said viewing portion.

2. The glove box of claim 1 wherein said access include an environmental lock antechamber.

3. The glove box of claim 2 wherein said environmental lock antechamber has piping to permit said antechamber to be flushed and charged with gases independently of said chamber.

4. The glove box of claim 1 wherein said glove box has at least a first parameter read out display, said read-out display being located outside said chamber.

5. The glove box of claim 1 wherein a seat is mounted within said chamber in which to accommodate the work-piece.

6. The glove box of claim 5 in which said enclosure is angularly adjustable relative to said seat.

7. The glove box of claim 1 having at least a first sealed utility penetration through a wall of said enclosure.

8. The glove box of claim 1 wherein said glove box has a heat exchanger mounted therewithin by which to adjust temperature within said chamber.

9. The glove box of claim 1 wherein said glove box has a tool interface therewithin, and said tool interface includes a coolant line connection.

10. The glove box of claim 1, said at least one gauntlet including a first gauntlet and a second gauntlet, wherein said glove box includes:
    an independently flushable access antechamber mounted to said enclosure;
    a seat in which to mount a work-piece;
    a welding electrode holder in which to mount a consumable electrode;
    a welding electrode power connection that passes through a sealed penetration of said enclosure, in use said welding electrode holder being mounted thereto;
    a heat exchanger mounted within said enclosure, and operable to extract heat therefrom;
    controls of at least one of (a) power to said welding electrode holder; and (b) cooling of said heat exchanger.

11. The glove box of claim 1 comprising:
    piping by which to introduce gases into said chamber; and
    an environmental control system operable to govern temperature within said chamber.

12. The glove box of claim 1 comprising:
    a tool for use by an operator to engage the work piece; and
    a controller of said tool mounted within said chamber, said controller being adjustable by an operator wearing said first gauntlet.

13. The glove box of claim 11 wherein said access include an environmental lock antechamber.

14. The glove box of claim 11 wherein a seat is mounted within said chamber in which to accommodate the work-piece; and said enclosure is angularly adjustable relative to said seat.

15. The glove box of claim 11 wherein said glove box has a tool interface therewithin, and said tool interface includes a coolant line connection.

16. The glove box of claim 11, said at least one gauntlet including a first gauntlet and a second gauntlet, wherein said glove box includes:
    an independently flushable access antechamber mounted to said enclosure;
    a seat in which to mount a work-piece;
    a welding electrode holder in which to mount a consumable electrode;
    a welding electrode power connection that passes through a sealed penetration of said enclosure, in use said welding electrode holder being mounted thereto;
    a heat exchanger mounted within said enclosure, and operable to extract heat therefrom;
    controls of at least one of (a) power to said welding electrode holder; and (b) cooling of said heat exchanger.

17. The glove box of claim 12 wherein said access include an environmental lock antechamber.

18. The glove box of claim 12 wherein a seat is mounted within said chamber in which to accommodate the work-piece; and said enclosure is angularly adjustable relative to said seat.

19. The glove box of claim 12 wherein said glove box has a tool interface therewithin, and said tool interface includes a coolant line connection.

20. The glove box of claim 12, said at least one gauntlet including a first gauntlet and a second gauntlet, wherein said glove box includes:
    an independently flushable access antechamber mounted to said enclosure;
    a seat in which to mount a work-piece;
    a welding electrode holder in which to mount a consumable electrode;
    a welding electrode power connection that passes through a sealed penetration of said enclosure, in use said welding electrode holder being mounted thereto;
    a heat exchanger mounted within said enclosure, and operable to extract heat therefrom;
    controls of at least one of (a) power to said welding electrode holder; and (b) cooling of said heat exchanger.

* * * * *